Figure 1:
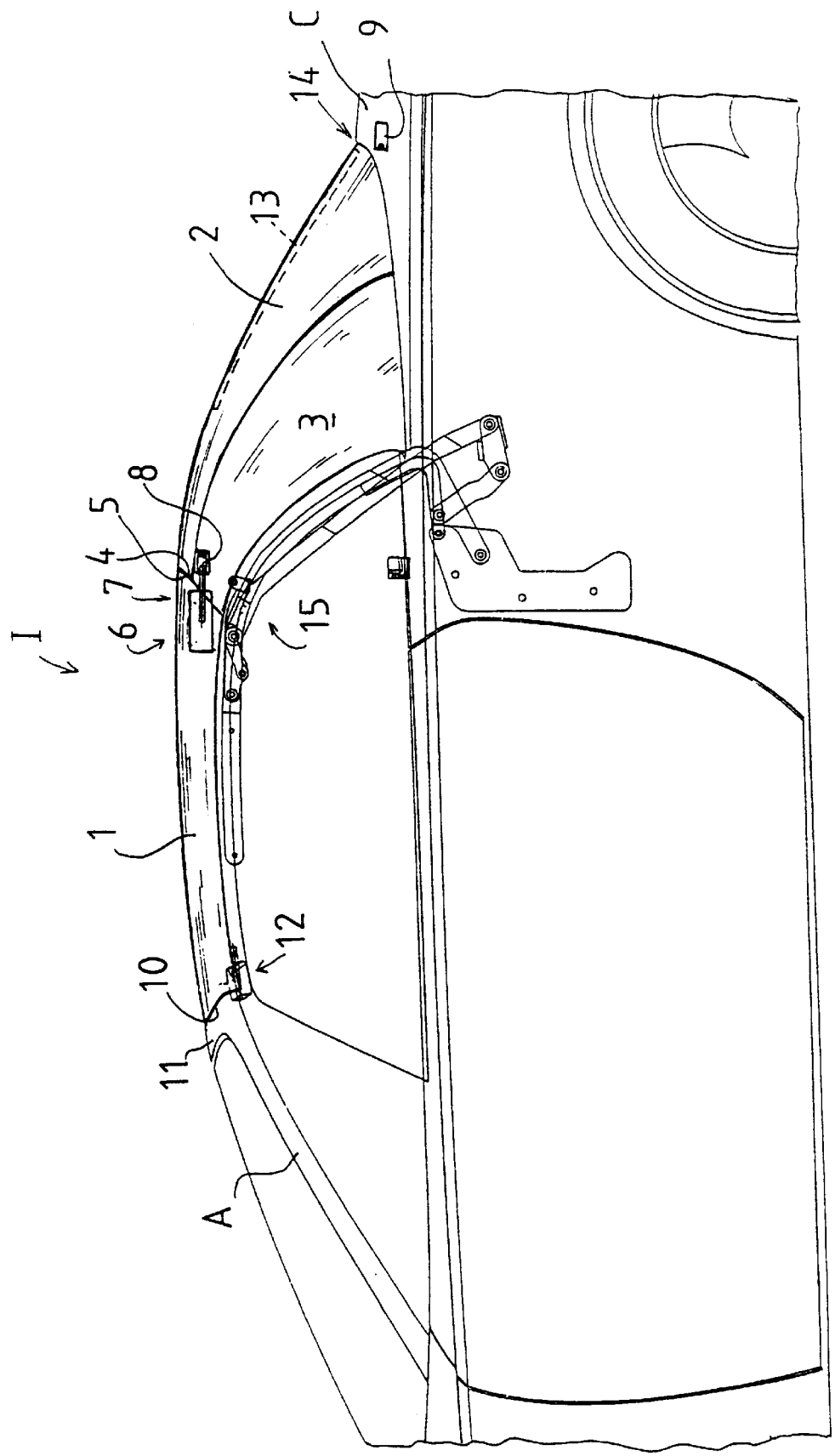

United States Patent
Mattila

[11] Patent Number: 6,033,008
[45] Date of Patent: Mar. 7, 2000

[54] FOLDING HARD TOP STRUCTURE FOR A CONVERTIBLE

[75] Inventor: Veijo Mattila, Uusikaupunki, Finland

[73] Assignee: Valmet Automotive Oy, Uusikaupunki, Finland

[21] Appl. No.: 09/085,595

[22] Filed: May 27, 1998

[30] Foreign Application Priority Data

Jun. 16, 1997 [FI] Finland ................................ 972562

[51] Int. Cl.⁷ ...................................................... B60J 7/19
[52] U.S. Cl. ...................... 296/107.17; 296/121; 296/124
[58] Field of Search .......... 296/107.01, 107.16, 296/107.17, 108, 116, 117, 120.1, 121, 124

[56] References Cited

U.S. PATENT DOCUMENTS

| | | | |
|---|---|---|---|
| 2,596,355 | 5/1952 | Ackermans | 296/107 |
| 3,536,354 | 10/1970 | Ingram | 296/147 |

FOREIGN PATENT DOCUMENTS

| | | | |
|---|---|---|---|
| 1049026 | 12/1953 | France | 296/107.17 |
| 2693956 | 1/1994 | France | 296/107.17 |
| 4326291 | 9/1994 | Germany | 296/121 |
| 402155830 | 6/1990 | Japan | 296/107.17 |
| 650 980 | 8/1985 | Switzerland . | |

*Primary Examiner*—D. Glenn Dayoan
*Assistant Examiner*—Paul Chenevert
*Attorney, Agent, or Firm*—Altera Law Group LLC

[57] ABSTRACT

Folding hard top structure for a convertible, said structure comprising substantially rigid roof panel parts (1, 2, 3) which, like the top of a saloon car, cover the passenger compartment of the convertible when the top is in a closed raised position (I) and which can be folded down to a lowered open position (II) leaving at least part of the passenger compartment uncovered, in which, in the raised position (I) of the car top, adjacent roof panel parts comprise a first roof panel part (1) having a first edge (4) and a second roof panel part (2) having a second edge (5) which, in the raised position (I) of the top, is fitted to butt against the first edge (4) of the first roof panel part (1), and which roof panel parts (1, 2) are apart from each other when the top is in the lowered open position (II). The top structure comprises a first locking device (6), which comprises locking elements (7) that can be engaged and disengaged and that are disposed in the area of the first edge (4) of the first roof panel part (1), and counterparts (8) disposed in the area of the second edge (5) of the second roof panel part (2), so that, in the raised position (I) of the top, the locking elements can be locked to their counterparts to lock the first roof panel part rigidly together with the second roof panel part.

11 Claims, 3 Drawing Sheets

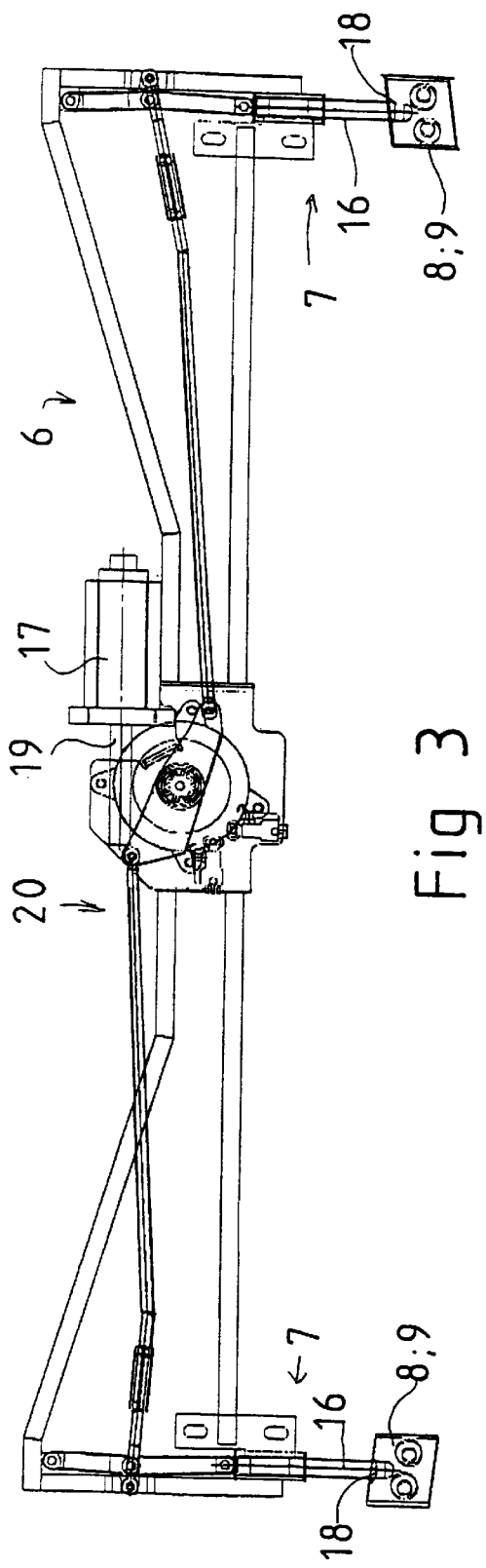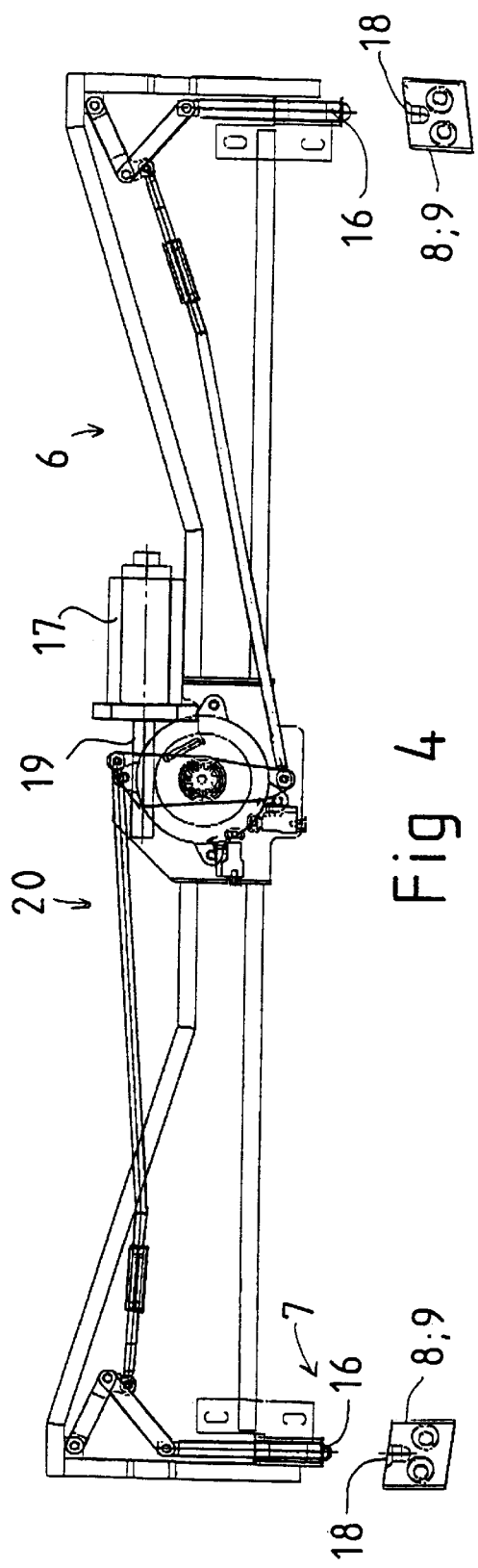
Fig 3
Fig 4

FOLDING HARD TOP STRUCTURE FOR A CONVERTIBLE

The present invention relates to a folding hard top structure for a convertible.

In prior art, specifications CH 650 980 and U.S. Pat. No. 2,596,355 present folding hard top structures which comprise substantially rigid roof panel parts covering the passenger compartment of a convertible when the top structure is in its closed position with the top raised. Correspondingly, the roof panel parts can be folded down to a lowered open position in which at least part of the passenger compartment is uncovered. In the raised position of the car top, adjacent roof panel parts comprise a first roof panel part having a first edge and a second roof panel part having a second edge which, in the raised position of the top, is fitted to butt against the first edge of the first roof panel part. In the lowered position of the top, the roof panel parts are apart from each other, without being connected to each other e.g. via hinges.

A problem with such a top structure in which adjacent roof panel parts butting against each other in the closed position are otherwise loose relative to each other is that the roof panel parts tend to move relative to each other during driving, generating irritating noise if they just rest against each other without being otherwise connected together. Moreover, such a top structure has a poor safety performance in the event of the vehicle rolling over.

The object of the present invention is to eliminate the drawbacks described above.

A specific object of the present invention is to disclose a top structure that is safer than earlier structures and in which the locking of the top in both the raised and lowered positions can be implemented in an advantageous and simple manner.

According to the invention, the top structure comprises a first locking device, which comprises locking elements that can be engaged and disengaged and that are disposed in the area of the first edge of a first roof panel part, and counterparts disposed in the area of the second edge of a second roof panel part, so that, in the raised position of the top, the locking elements can be locked to their counterparts so as to lock the first edge of the first roof panel part rigidly together with the second edge of the second roof panel part.

In an embodiment of the hard top structure, the body of the convertible is provided with second counterparts which, acting together with the locking elements, are fitted to lock the first roof panel part rigidly to the car body when the top is in its lowered open position. In this case, the first roof panel part in the open position can be locked firmly to the body so as to make it immovable relative to the body, using the same locking elements that are used to lock it in the raised position in which the top is closed. This allows a low noise level to be achieved.

In an embodiment of the hard top structure, the first roof panel part is the foremost part of the hard top structure, and the first roof panel part comprises a front edge which in the raised position of the folding top is directed forward as seen in the travelling direction of the vehicle and fitted to meet the crossbar at the top edge of the windshield of the convertible, to be locked on it with a second locking device. The first edge of the first roof panel part is its rearward directed edge. The first locking device may be the only locking device provided with a power means in the hard top structure. The second locking device may consist of e.g. a simple guide pin, tag or the like which is inserted into a counterpart, such as a socket or the like, in the windshield top edge crossbar.

It will be advantageous to place the power-operated first locking device at the rear edge of the first roof panel because there is more room for it at the rear edge than at the front edge. Moreover, placing the locking device on the first roof panel part provides an advantage in respect of manufacture because the device can be pre-assembled as part of the car top complex.

In an embodiment of the hard top structure, the second edge of the second roof panel part is the forward directed edge as seen in the raised position of the top structure. The second roof panel part is that part of the car top to which the rear window is attached, said second roof panel part comprising a rear edge by which the second roof panel part is hinged on the body of the convertible so that it can be turned between a raised position and a lowered position.

In an embodiment of the hard top structure, the structure comprises a shifter mechanism with a number of articulated arms arranged as a jointed parallelogram mechanism, by means of which the first roof panel part can be moved between the raised position and the lowered position while substantially maintaining its orientation.

In an embodiment of the hard top structure, the locking elements comprise two latch pins disposed at a distance from each other, arranged to be moved by a power means parallelly relative to each other and horizontally. The counterpart comprises a socket fitted to receive the latch pin.

In an embodiment of the hard top structure, the power means is an electric motor having a rotating shaft. The first locking device comprises transmission elements for transmitting the rotary motion of the shaft so as to produce a movement of each latch pin. An electromechanical locking system like this can be controlled by the control logic used to control the operation of the mechanism of the folding top structure.

In an embodiment of the hard top structure, the first locking device has been arranged to adjust the clearance between the first roof panel part and the second roof panel part as well as the compressive force between the panel parts in the closed raised position of the folding top.

In an embodiment of the hard top structure, the first locking device has been fitted to adjust the clearance between the first roof panel part and the body of the convertible in the lowered position of the folding top.

Figure 2:
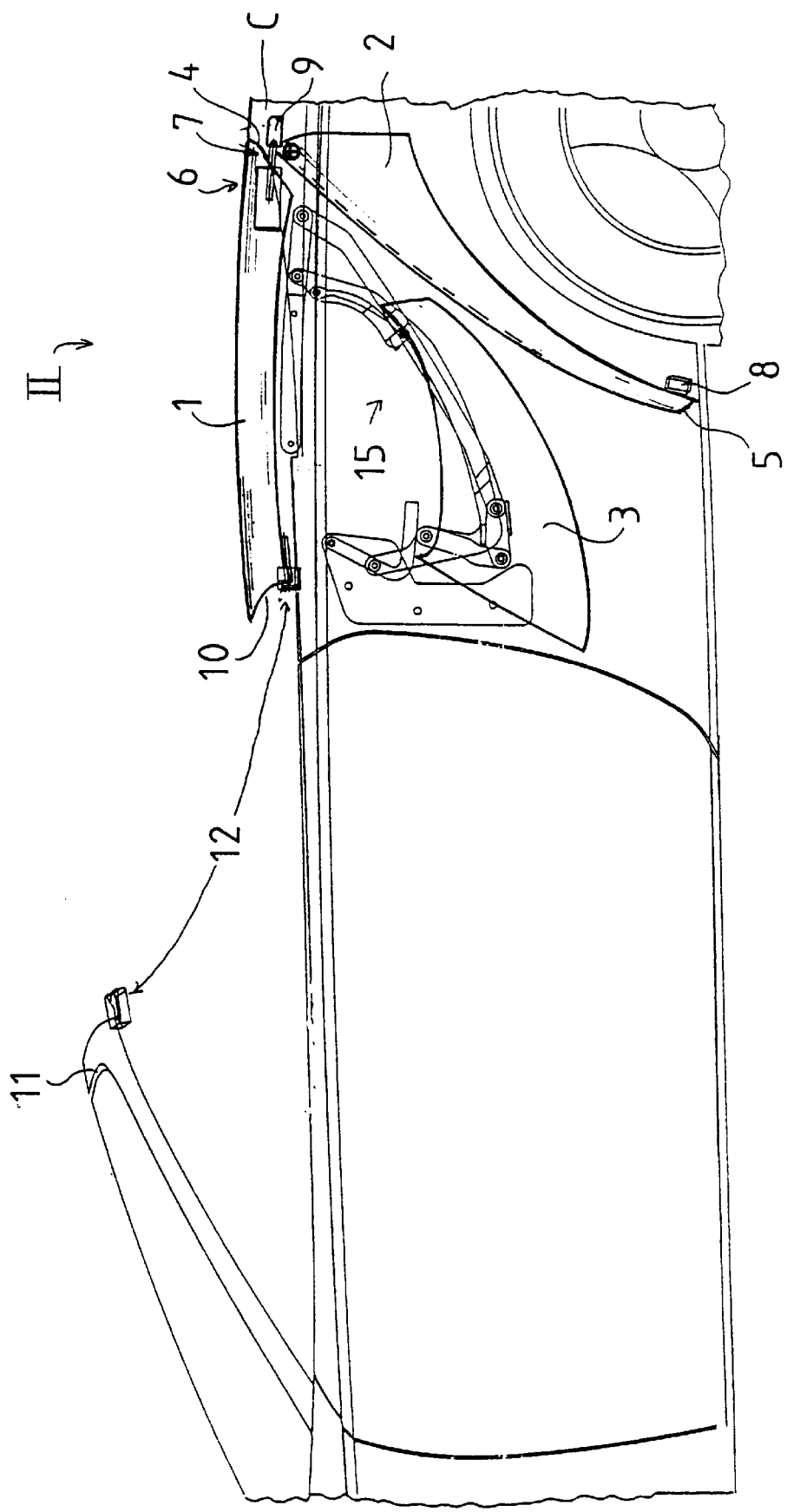

In the following, the invention will be described in detail by the aid of a few examples of its embodiments by referring to the attached drawing, in which FIG. 1 is a diagrammatic side view of a first embodiment of the folding top structure for a convertible as provided by the invention, with the top in its closed, raised position, FIG. 2 presents the folding top structure of FIG. 1 in its open, lowered position, FIG. 3 is a diagrammatic top view of a locking device comprised in an embodiment of the folding top structure of the invention, with the locking engaged, and FIG. 4 presents the locking device of FIG. 3 with the locking disengaged.

FIGS. 1 and 2 present a folding hard top structure for a convertible. The folding top structure comprises substantially rigid roof panel parts 1, 2, 3 which cover the passenger compartment of the convertible like the top of a saloon car when the top is in its closed raised position I as illustrated by FIG. 1. The roof panel parts 1, 2 and 3 can be folded down into an open lowered position II as illustrated by FIG. 2, leaving part of the passenger compartment uncovered. The first roof panel part 1 is the foremost one of the movable parts of the folding top when the top is in the position illustrated by FIG. 1. The front edge 10 of the first roof panel part 1 has been fitted to meet the windscreen crossbar 11. The windscreen crossbar 11 is a substantially horizontal beam at the upper edge of the windscreen, extending between the A-columns and forming a fixed part of the car body. The front edge 10 of the first roof panel part 1 is provided with a pin, tag or the like which, in the position illustrated by FIG. 1, is in a corresponding socket, hole or the like.

The top structure further comprises a second roof panel part 2, which is provided with a rear window 13. The second roof panel part 2 is hinged on the car body with hinges placed near the lower edge of the rear window so that the window can be turned down about its hinge axis to a lowered position as II illustrated by FIG. 2. In the raised position I shown in FIG. 1, the front edge 5 of the second roof panel part 2 is forward directed and butting against the rear edge 4 of the first roof panel part 1. These front edge 5 and rear edge 4 are so fitted together that, in the closed raised position I, the roof panel parts 1 and 2 form a coherent top assembly. In the opened position II illustrated by FIG. 2, the roof panel parts 1 and 2 are completely separated from each other.

The top structure comprises a first locking device 6 for locking the roof panel parts 1 and 2 to each other. The locking device 6 comprises locking elements 7 which can be engaged and disengaged and which are disposed in the area of the rear edge 4 of the first roof panel part 1, and counterparts 8 disposed in the area of the front edge 5 of the second roof panel part 2. In the raised position I of the top, the locking elements 7 can be locked to the counterparts 8 so as to lock the first roof panel part 1 rigidly together with the second roof panel part 2. An embodiment of the locking device 6 is presented in FIGS. 3 and 4, and the locking device 6 will be described in greater detail in conjunction with these figures.

The top structure illustrated by FIGS. 1 and 2 also comprises a third roof panel part 3, i.e. a side panel part 3, one such part being provided on either side of the car. The side panel part 3 corresponds to the C-column and it may comprise a small side window mounted in it. The side panel part 3, too, can be turned into a lowered position II as shown in FIG. 2. In position II, all the roof panel parts 1, 2 and 3 are in a stowage behind the front seats (not shown) of the vehicle.

The hard top structure comprises a jointed parallelogram mechanism 15 comprising a number of articulated arms pivoted on each other, by means of which the first roof panel part 1 can be moved between the raised position I and the lowered position II while substantially maintaining its orientation. The articulated arms of the jointed parallelagram mechanism 15 can be arranged in numerous other ways besides that shown in FIGS. 1 and 2 to achieve the desired kinematic performance. Folding top mechanisms are part of the expertise of the person skilled in the art, so they will not be described here in detail. In the lowered position II illustrated by FIG. 2, the second roof panel part 2 has been turned downward about its hinge axis while the first and third roof panel parts 1 and 3 have been lowered by means of the jointed parallelogram mechanism 15 so that the first roof panel part 1 covers the other parts of the folding top as well as the mechanism. The body C of the convertible has been provided with a second set of counterparts 9 which, acting together with the locking elements 7, are fitted to lock the first roof panel part 1 rigidly to the car body when the top is in its lowered open position II. The first counterparts 8 and the second counterparts 9 are substantially identical because the same locking elements 7 are used to effect locking in them. When locked in the lowered position as in FIG. 2, the first roof panel part 1 is held firmly in place relative to the car body.

FIGS. 3 and 4 present an example of the structure of the first locking device 6. The locking elements 7 comprise two latch pins 16 disposed at a distance from each other and arranged to be moved by a power means 17 in substantially parallel directions and horizontally. The counterpart 8, 9 comprises a socket 18 fitted to receive the latch pin 16. The back-and-forth movement of the latch pins of the locking device can be accomplished using any one of a wide variety of mechanisms, the design of which is part of the expertise of the person skilled in the art. As illustrated by FIGS. 3 and 4, the latch pin motion can be produced using a shared power means 17, which may be e.g. an electric motor with a rotating shaft 19 from which, using suitable transmission elements 20, the motion is transmitted to the latch pins 16, producing a linear motion of both latch pins 16. As shown in FIGS. 3 and 4, the transmission elements 20 may comprise an angle transmission with a turning arm connected to its output shaft and two connecting rods connected to the turning arm. The connecting rods are connected to the latch pins via an elbow joint mechanism. The latch pins can also be actuated by two separate power means.

The first locking device 6 can suitably be used to adjust the clearance between the first roof panel part 1 and the second roof panel part 2 as well as the compressive force between the panel parts in the closed raised position I of the car top. Correspondingly, the first locking device 6 can be used to adjust the clearance between the first roof panel part 1 and the body C of the convertible in the open lowered position II of the car top.

The invention is not restricted to the examples of its embodiments described above, but many variations are possible within the scope of the inventive idea defined by the claims.

I claim:

1. Folding hard top structure for a convertible car, said structure comprising substantially rigid roof panel parts which cover the passenger compartment of the convertible when the top is in a closed raised position and which can be folded down to a lowered open position leaving at least part of the passenger compartment uncovered, in which, in the raised position of the car top, adjacent roof panel parts comprise a first roof panel part having a first edge and a second roof panel part having a second edge which, in the raised position of the top, is fitted to butt against the first edge of the first roof panel part, and which roof panel parts are apart from each other when the top is in the lowered position, characterized in that the top structure comprises a first locking device, which comprises locking elements that can be engaged and disengaged and that are disposed in the area of the first edge of the first roof panel part, a first set of counterparts disposed in the area of the second edge of the second roof panel part, so that, in the raised position of the top, the locking elements can be locked to their respective counterparts to lock the first roof panel, part rigidly together with the second roof panel part, and a second set of counterparts, disposed on a body of the car to secure the first roof panel part when in the lowered, open position.

2. Top structure as defined in claim 1, characterised in that the first roof panel part (1) is the foremost part of the hard top structure, and the first roof panel part comprises a front edge (10) which in the raised position (I) of the folding top is directed forward as seen in the travelling direction of the vehicle and fitted to meet the windshield top edge crossbar (11) of the convertible, to be locked to it with a second locking device (12); and that the first edge (4) of the first roof panel part (1) is its rearward directed edge.

3. Top structure as defined in claim 1, characterised in that the second edge (5) of the second roof panel part (2) is the forward directed edge as seen in the raised position (I) of the top; and that the second roof panel part (2) is that part of the top structure to which the rear window (13) is attached, said second roof panel part comprising a rear edge (14) by which the second roof panel part is hinged on the body of the convertible so that it can be turned between the raised position (I) and the lowered position (II).

4. Top structure as defined in claim 1, characterised in that the top structure comprises a shifter mechanism (15) with a number of articulated arms arranged as a jointed parallelogram mechanism, by means of which the first roof panel part (1) can be moved between the raised position (I) and the lowered position (II) while substantially maintaining its orientation.

5. Top structure as defined in claim 1, characterised in that the locking elements (7) comprise two latch pins (16) disposed at a distance from each other and arranged to be moved by a power means (17) parallelly with respect to each other and horizontally; and that the counterpart (8, 9) comprises a socket (18) fitted to receive a latch pin (16).

6. Top structure as defined in claim 5, characterised in that the power means (17) is an electric motor having a rotating shaft (19); and that the first locking device (6) comprises transmission elements (20) for transmitting the rotary motion of the shaft (19) so as to produce a movement of each latch pin (16).

7. Top structure as defined in claim 1, characterised in that the first locking device (6) has been arranged to adjust the clearance between the first roof panel part (1) and the second roof panel part (2) as well as the compressive force between the panel parts in the closed raised position (I) of the folding top.

8. Top structure as defined in claim 1, characterised in that the first locking device (6) has been arranged to adjust the clearance between the first roof panel part (1) and the body (C) of the convertible in the lowered position (II) of the folding top.

9. Folding hard top structure for a convertible car, said structure comprising substantially rigid roof panel parts which cover the passenger compartment of the convertible when the top is in a closed raised position and which can be folded down to a lowered open position leaving at least part of the passenger compartment uncovered, in which, in the raised position of the car top, adjacent roof panel parts comprise a first roof panel part having a first edge and a second roof panel part having a second edge which, in the raised position of the top, is fitted to butt against the first edge of the first roof panel part, and which roof panel parts are apart from each other when the top is in the lowered position, characterized in that the top structure comprises a first locking device, which comprises locking elements that can be engaged and disengaged and that are disposed in the area of the first edge of the first roof panel part, and counterparts disposed in the area of the second edge of the second roof panel part, so that, in the raised position of the top, the locking elements can be locked to respective counterparts to lock the first roof panel part rigidly together with the second roof panel part, wherein the locking elements include two latch pins disposed at a distance from each other and arranged to be moved in parallel with respect to each other and horizontally by a power means, and the counterparts each include a socket fitted to receive the latch pin.

10. A top structure as defined in claim 9, wherein the power means includes an electric motor having a rotating shaft, the first locking device includes transmission elements for transmitting rotary motion of the shaft so as to produce movement of each latch pin.

11. Folding hard top structure for a convertible car, said structure comprising substantially rigid roof panel parts which cover the passenger compartment of the convertible when the top is in a closed raised position and which can be folded down to a lowered open position leaving at least part of the passenger compartment uncovered, in which, in the raised position of the car top, adjacent roof panel parts comprise a first roof panel part having a first edge and a second roof panel part having a second edge which, in the raised position of the top, is fitted to butt against the first edge of the first roof panel part, and which roof panel parts are apart from each other when the top is in the lowered position, characterized in that the top structure comprises a first locking device, which comprises locking elements that can be engaged and disengaged and that are disposed in the area of the first edge of the first roof panel part, and counterparts disposed in the area of the second edge of the second roof panel part, so that, in the raised position of the top, the locking elements can be locked to respective counterparts to lock the first roof panel part rigidly together with the second roof panel part, wherein the first locking device is arranged to adjust a clearance between the body of the car and the first roof panel part when the folding top is in the lowered, open position.

* * * * *